(12) United States Patent
Bosgoed

(10) Patent No.: US 9,458,898 B2
(45) Date of Patent: Oct. 4, 2016

(54) OVER-RUNNING CLUTCH

(71) Applicant: Forest Group Nederland B.V., Deventer (NL)

(72) Inventor: Henricus Wilhelmus Frederikus Bosgoed, Schalkhaar (NL)

(73) Assignee: Forest Group Nederland B.V. (NL)

( * ) Notice: Subject to any disclaimer, the term of this patent is extended or adjusted under 35 U.S.C. 154(b) by 52 days.

(21) Appl. No.: 14/386,864

(22) PCT Filed: May 13, 2013

(86) PCT No.: PCT/NL2013/000027
§ 371 (c)(1),
(2) Date: Sep. 22, 2014

(87) PCT Pub. No.: WO2013/176539
PCT Pub. Date: Nov. 28, 2013

(65) Prior Publication Data
US 2015/0060231 A1 Mar. 5, 2015

(30) Foreign Application Priority Data
May 23, 2012 (NL) .................................... 1039622

(51) Int. Cl.
| F16D 43/02 | (2006.01) |
| F16D 41/18 | (2006.01) |
| F16D 43/04 | (2006.01) |
| F16D 41/10 | (2006.01) |
| F16D 43/202 | (2006.01) |

(52) U.S. Cl.
CPC ............... *F16D 43/02* (2013.01); *F16D 41/10* (2013.01); *F16D 41/18* (2013.01); *F16D 43/04* (2013.01); *F16D 43/2028* (2013.01)

(58) Field of Classification Search
CPC ..... F16D 41/10; F16D 41/18; F16D 43/2048
USPC ........................................................ 192/54.5
See application file for complete search history.

(56) References Cited

U.S. PATENT DOCUMENTS

| 1,806,340 | A | * | 5/1931 | Francis | ................... | F16H 39/02 |
| | | | | | | 192/43.2 |
| 3,300,003 | A | | 1/1967 | Perterson et al. | | |
| 4,919,244 | A | * | 4/1990 | Bondioli | ................. | F16D 7/028 |
| | | | | | | 192/56.1 |

(Continued)

FOREIGN PATENT DOCUMENTS

| GB | 499608 | | 1/1939 |
| JP | 02245521 | A * | 10/1990 |

(Continued)

*Primary Examiner* — Richard Lorence
(74) *Attorney, Agent, or Firm* — Laubscher, Spendlove & Laubscher, P.C.

(57) ABSTRACT

An over-running clutch couples a motor driven shaft to a driven element in which the element can freely rotate when the motor is switched off. The driven shaft of the clutch includes a flattened portion with two flat surfaces. A wall of a coupling member engages one of the surfaces when the driven shaft stands still. The coupling member includes an outwardly extending cam which is received in a sleeve of a cylindrical collar positioned on a disk which is rotatably mounted on the driven shaft. When the shaft is rotated, the coupling member is pressed outward over a limited distance and the cam enters a recess provided in the inner wall of a cylindrical drive portion forming part of the driven element.

2 Claims, 1 Drawing Sheet

(56) References Cited

U.S. PATENT DOCUMENTS 5,582,279 A * 12/1996 Buchanan, Jr. et al. ... B60J 5/06
                                                                    192/104 B
2012/0098367 A1    4/2012  Mizutani et al.

FOREIGN PATENT DOCUMENTS

| JP | 05231449 A | * | 9/1993 |
|----|------------|---|--------|
| WO | 0005467 A1 |   | 2/2000 |

* cited by examiner

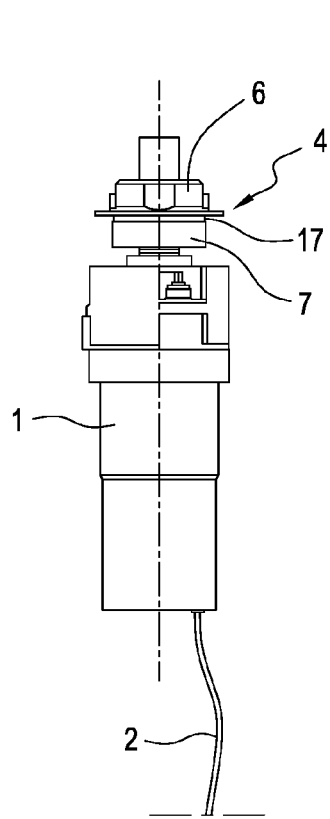
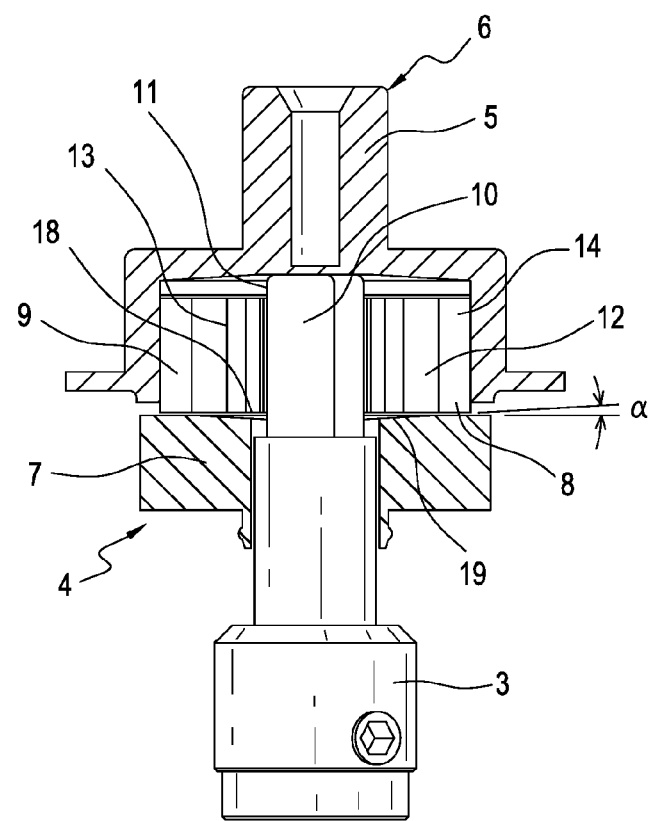
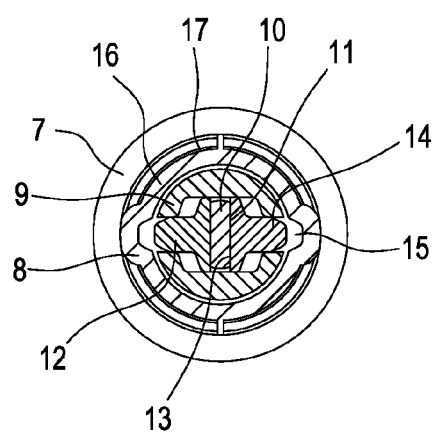
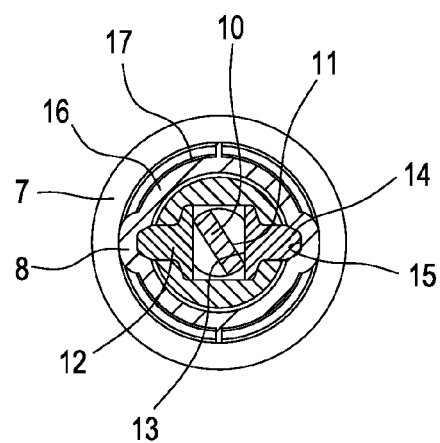

OVER-RUNNING CLUTCH

CROSS-REFERENCE TO RELATED APPLICATIONS

This application is a §371 National Stage Entry of PCT International Application No. PCT/NL2013/000027 filed May 13, 2013. PCT/NL2013/000027 claims priority of NL Application No. NL 1039622 filed May 23, 2012. The entire content of these applications are incorporated herein by reference.

BACKGROUND OF THE INVENTION

The invention relates to an over-running clutch for connecting a motor-driven shaft to a driven element, in which when the motor is switched off the driven element can rotate freely. The driven shaft includes planes for cooperating with coupling members oppositely positioned between disks such that they can move inward and outward such that when in the outward position the coupling members are partly received in a receiving member connected to the driven element.

BRIEF DESCRIPTION OF THE PRIOR ART

An over-running clutch is known from WO 00/05467 A1. In this known clutch, a disk is mounted on the driven shaft, provided with outwardly extending legs cooperating with the coupling members. The coupling members are separate parts and are pressed outwardly by the legs and are moved inwardly by means of an O-shaped spring when they are moving away from the legs. When the motor is switched on, the coupling members have to be pressed outwardly against the force of the spring. Accordingly it is possible that the driven element will not be rotated and friction will occur.

It might be remarked that U.S. Pat. No. 3,300,003 discloses a clutch in which a disk is mounted on a driven shaft and is provided with an extending portion with two surfaces for receiving a key of a split washer pawl. The center of gravity of the disk does not coincide with the centerline of the shaft. When the shaft is rotated by the electric motor, the pawl will be moved by an eccentric force and a tooth of the pawl will engage a tooth of a ratchet gear. Obviously, this clutch can only be driven in one direction of rotation, and the dimensions and mass of the disk must be sufficient to deliver a given eccentric force. As known, an eccentric force and mass are undesireable in case of rotating parts.

Further, GB Patent No. 499,608 discloses a clutch in which the shaft is provided with inclined flat surfaces against which parts abut which, when the shaft is rotated in a given direction, will be pressed outwardly against an inner cylindrical wall of the driven element. This element must be driven by a frictional force which results in wear over time.

SUMMARY OF THE INVENTION

The object of the invention is to provide a clutch which avoids this problem. A further object of the invention is to construct the clutch more simply with fewer parts.

According to the invention, the over-running clutch includes a motor-driven shaft having a flattened portion with two flat contact surfaces opposite each other. The flat contacting surface of a coupling member can lie against each of the contact surfaces of the shaft when the motor is switched off. When the motor is switched on, the shaft will rotate over a given angle such that the coupling members are moved outwardly and a cam of each coupling member will be received in a recess provided in the inner wall of a receiving member in the shape of a cylindrical member connected to the driven element.

In this way, a very compact clutch is obtained in which the coupling members directly engage the shaft and the cams of the coupling members will directly cooperate with the driven element, so that no separate parts, such as a spring, are necessary for moving the coupling members inwardly. Additionally, when a suitable electric motor is used the clutch can work in both directions.

According to a further embodiment of the invention, at least a part of the surface of the disk which contacts a coupling member defines an angle between 4 and 10° with the contact surface of the coupling member running square to the centerline of the shaft. Accordingly, the distance between the contact surface of the shaft and the contact surface of the coupling member increases in the direction of the centerline.

According to this embodiment, the coupling members will easily turn over when the shaft is stopped and will exit the recesses of the cylindrical collar of the drive portion.

BRIEF DESCRIPTION OF THE FIGURES

The invention is further described below with reference to the accompanying drawing, in which:

FIG. 1 shows a side view of a fixed electric motor, having a driven shaft connected to an over-running clutch according to the invention which in turn is coupled at its other side to a drive portion forming part of the element which has to be driven;

FIG. 2 shows a cross-section, at a larger scale, of the clutch with the driven shaft and of the drive portion forming part of the element to be driven;

FIG. 3 shows a cross-section of the clutch in the uncoupled position; and

FIG. 4 shows a cross-section in the coupled position.

DETAILED DESCRIPTION

FIG. 1 shows an electric motor 1 which is fixed and to which electric energy is provided via a cable 2.

As shown in FIG. 2 the shaft of the electric motor 1 is connected to the shaft 3 of the over-running clutch 4 which at its other end is coupled to the drive portion 5 forming part of a driven element 6, which is not further shown.

The shaft 3 is provided with a disk 7, which is rotatable on the shaft. A cylindrical collar 8 is arranged on an upper contact surface 18 of the disk and two opposing sleeves 9 are arranged within the collar as also shown in FIGS. 3 and 4. In the vicinity of the collar 8 and the sleeves 9 the shaft 3 is provided with a flattened portion 10 defining contact surfaces 11.

As shown particularly in FIGS. 3 and 4, near each of the surfaces 11 a coupling element 12 is present, the surface 13 of which can be in contact with a surface 11 of the flattened portion 10 of the shaft 3. The coupling element 12 includes a cam 14 which extends through the sleeve 9.

As shown in FIG. 2 the contact surface 18 of the disk 7 is arranged an angle α with the opposite lying contact surface 19 of the coupling element 12, in such a way that the distance between the surfaces 18 and 19 is increased towards the shaft 3.

FIG. 3 shows the position in which the shaft 3 is stationary and the surfaces 13 of the coupling elements 12 lie against the surfaces 11 of the shaft 3, while the cams 14 are positioned in the sleeves 9.

Now, when the shaft 3 is driven by the electric motor 1 the position will be obtained as shown in FIG. 4. By rotating the shaft 3 and consequently the flattened portion 10, the coupling elements 12 are pressed outwardly and the cams 14 are received in recesses 15 provided in the inner wall 16 of a cylindrical portion 17 connected to the driven portion 5 mentioned above and forming part of the driven element 6.

When the electric motor 1 is switched off, the motor can be programmed such that the shaft 3 turns back over a given angle in the opposite direction such that the shaft 3 will stand still in such a position that the surfaces 11 of the portion 10 of the shaft 3 will lie parallel to the surfaces 13 of the coupling element 12 as shown in FIG. 3.

Rotation of the element 6 will ensure that the surfaces 13 of the elements 12 are pressed against the surfaces 11 of the flattened portion 10 of the shaft 3, such that the position is reached as shown in FIG. 3. To reach and maintain this position, as described above, the surface 18 of the disk 7 defines an angle of 4 to 10° with respect to the surfaces 19 of the coupling elements 12.

It will be obvious that only one possible embodiment of an over-running clutch according to the invention is shown in the drawing and described above and that many modifications can be applied without leaving the inventive idea as this is indicated in the accompanying claims.

The invention claimed is:

1. An over-running clutch for a driven element, comprising
    (a) a drive shaft including a flattened portion having two opposed flat surfaces;
    (b) a disk mounted on said drive shaft for rotation relative to said drive shaft;
    (c) a cylindrical member connected with the driven element and containing a pair of opposed recesses in an inner surface of said cylindrical member;
    (d) a pair of opposed coupling members arranged within said cylindrical member and supported by said disk, at least a portion of an upper surface of said disk which supports said coupling members being arranged at an angle between 4 and 10° relative to a lower surface of said coupling members extending perpendicular to a centerline of said drive shaft, a distance between said lower surfaces of said coupling members and said disk upper surface increasing in the direction of the centerline of said drive shaft, said coupling members each including a contact surface at one end adjacent to said drive shaft and a cam extending from an opposite end, said drive shaft being connected with a motor and operable to rotate through a given angle between an engaged position when the motor is activated wherein said drive shaft flattened portion engages said coupling member contact surfaces to displace said coupling members outwardly to positions where said earns enter said cylindrical member recesses, respectively, to drive the driven element with said drive shaft and a disengaged position when the motor is inactive and said drive shaft flat surfaces lie against said coupling member contact surfaces and said coupling members move inwardly with said cams free of said cylindrical member recesses.

2. An over-running clutch according to claim 1, and further comprising a pair of spaced opposed sleeves within said cylindrical member on opposite sides of said coupling members for supporting said coupling members in inward and outward positions.

* * * * *